United States Patent [19]

Niiho et al.

[11] Patent Number: 4,636,068
[45] Date of Patent: Jan. 13, 1987

[54] CHANGE-OVER SHUTTER FOR LIGHT-WAVE RANGE FINDER

[75] Inventors: Masaaki Niiho; Kiyoshi Itoh; Shinichi Suzuki; Takuo Itagaki; Koji Tsuda, all of Tokyo, Japan

[73] Assignee: Asahi Kogaku Kogyo Kabushiki Kaisha, Tokyo, Japan

[21] Appl. No.: 486,169

[22] Filed: Apr. 18, 1983

[30] Foreign Application Priority Data

Apr. 19, 1982 [JP] Japan .............................. 57-56738[U]

[51] Int. Cl.4 ............................ G01C 3/08; G02B 5/22
[52] U.S. Cl. ......................................... 356/5; 350/315; 350/314
[58] Field of Search ............... 356/4, 5; 350/315, 314; 354/403

[56] References Cited

U.S. PATENT DOCUMENTS

| | | | |
|---|---|---|---|
| 578,147 | 3/1897 | Harrison | 350/315 |
| 2,734,435 | 11/1951 | Leonardi | 350/315 |
| 3,500,050 | 3/1970 | Hillman | 356/28 |
| 3,619,058 | 11/1971 | Hewlett et al. | 356/5 |
| 4,101,221 | 7/1978 | Schunck et al. | 356/434 |
| 4,165,919 | 8/1979 | Little | 350/314 |

FOREIGN PATENT DOCUMENTS 0486484  9/1952  Canada ................................. 356/4

Primary Examiner—Stephen C. Buczinski
Assistant Examiner—Linda J. Wallace
Attorney, Agent, or Firm—Sughrue, Mion, Zinn, Macpeak and Seas

[57] ABSTRACT

A change-over shutter for an optical range finder employs at least two slits for measurement light, one of which is employed during long distance measurements and the other of which includes a light reduction member and is employed for short distance measurements. The arrangement advantageously eliminates measurement error caused in short distance measurements due to light secondarily reflected from the light emitting element.

12 Claims, 7 Drawing Figures

CHANGE-OVER SHUTTER FOR LIGHT-WAVE RANGE FINDER

BACKGROUND OF THE INVENTION

The present invention relates to an improvement in the change-over shutter of a light-wave range finder.

A light-wave range finder measures distance by measuring a phase difference in a manner such that light emitted from a light emitting element such as a light emitting diode (LED) and modulated with a predetermined frequency is emitted towards a reflector such as a corner-cube or the like placed at the position to be measured, the reflected light from the reflector being focussed on a light receiving element, the reflected light then being converted into an electrical signal, to detect the distance by measuring the difference in phase between the phase at modulation and as received.

In the light-wave range finder thus constructed, the measuring error in the distance is important in the performance of the device, this measuring error being produced by electrical and/or optical causes.

SUMMARY OF THE INVENTION

The object of the present invention resides in the elimination of the optical causes of the above error and presents a change-over shutter for a light-wave range finder having less measuring error than that of conventional

DETAILED DESCRIPTION OF THE PREFERRED EMBODIMENTS

As one of the optical causes producing measuring error in the light-wave range finder, unnecessary stray light due to reflections of several parts in the device may be considered.

Even with a very small amount of stray light, measuring error is actually caused as the same is received at the light receiving portion.

Among the stray light causing the measuring error, stray light hereinafter referred to as a secondary reflection stray light, produced by the fact that the light reflected from the reflector such as the corner-cube is reflected at a light emitting or light receiving portion, is especially troublesome.

Figure 1:
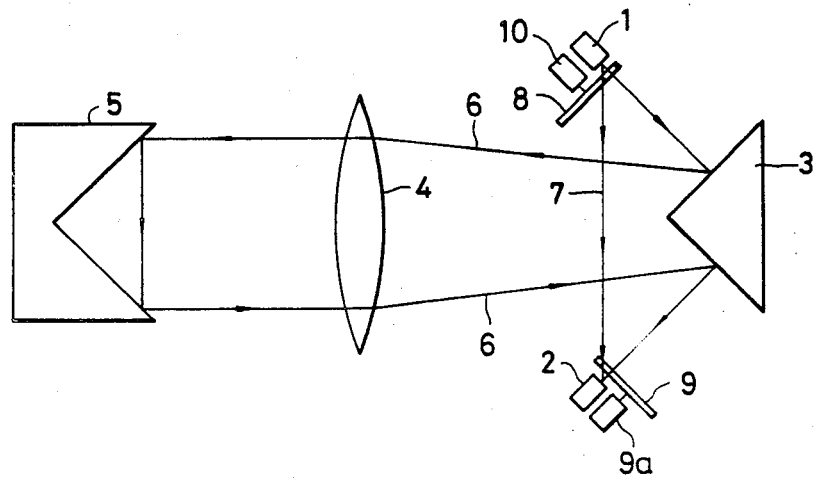
FIG. 1 is a schematic diagram showing a light-wave range finder.
Figure 2:
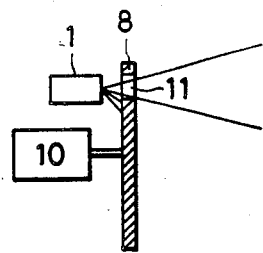
FIGS. 2(a) and (b) are sectional views of a device arranged with a light emitting portion and a change-over shutter for changing over measurement and compensation light.
FIG. 2(c) is a front view of a conventional change-over shutter.
Figure 2:
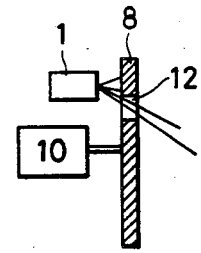
Figure 2:
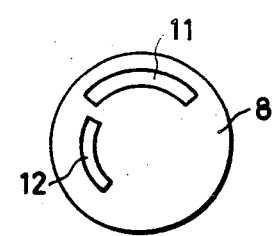

Referring to FIGS. 1 and 2, the above-mentioned phenomena will be more specifically explained. Modulated light emitted from a light emitting portion 1 is emitted as parallel light from one side of a light emitting and receiving lens 4 via a light dividing prism 3 for dividing emitted and received light, respectively. The modulated light is reflected by a reflector 5 such as a corner-cube to pass through the other side of the light emitting and receiving lens 4, and there is converged onto the light receiving portion 2 via the light dividing prism 3. The light passing along the optical path 6 is referred to as measurement light hereinafter. On the other hand, light passing along the optical path 7 from the light emitting portion 1 to the light receiving portion 2, for compensating the measuring error caused in a electronic measuring circuit portion, will be referred to as compensation light hereinafter.

The change-over between measurement light and compensation light is achieved by a disc-like change-over shutter 8 provided in front of the light emitting portion 1. As shown in FIG. 2 (c), on the change-over shutter 8 there are provided an arc-shaped measurement slit 11 for passing measurement light and an arc-shaped compensation slit 12 for passing compensation light, with a predetermined angular displacement therebetween. A driving motor 10 rotates the change-over shutter 8 in sector-form like reciprocating motion to thereby alternately divide the light from the light emitting portion 1 into measurement light and compensation light as shown in FIGS. 2(a) and (b).

Further in front of the light receiving portion 2 there is provided a light quantity adjuster 9 having a compensation track for compensation light and a measurement track for measurement light, the two tracks having density gradients, respectively, in order to adjust the light intensities of the compensation and measurement light respectively received by the light receiving portion 2 to an equal level. The light quantity adjuster 9 is rotated by a motor 9a or the like. The motor 9a is controlled by an electronic circuit (not shown) in accordance with the relative intensity of the compensation light and the measurement light.

In measuring distance with the above light-wave range finder, the pencil of measurement light reflected by the reflector 5 positioned at the measurement point has a diameter covering not only the other side of the light emitting and receiving lens 4 but the whole of the light emitting and receiving lens 4, so that the measurement light passing through the first side (the upper side in FIG. 1) of the light emitting and receiving lens 4 is focused on the light emitting portion 1. At that time, measurement light reflected by the light emitting portion 1 is reflected back to the reflector 5 through the light emitting and receiving lens 4 to thereby become secondary reflection stray light. If the secondary reflection stray light is received at the light receiving portion 2 and is incorporated into a distance measuring signal, the value of the measured distance will include a measuring error. With stray light of this type, the larger the distance between the reflector 5 and the light dividing prism 3, the more the influence of measuring error is decreased; however in the case of a short distance, the measuring error is not negligible.

On the other hand, if measurement light passing through the other (lower) side of the light emitting and receiving lens 4 is reflected at the light receiving portion 2, it also becomes secondary reflection stray light. However since there is provided a light-quantity reducing devices 9 in front of the light receiving portion 2, the secondary reflection stray light is received on the light receiving portion 2 only after this secondary reflection stray light passes through the light-quantity reducing device 9 two times, even if the secondary reflection stray light is reflected at the light receiving portion 2. Therefore, secondary reflection stray light with respect to the light receiving portion 2 does not much effect the measuring error.

In conventional devices, a light emitting portion with a low reflection ratio, and a light-quantity reducing device have been used for the purpose of avoiding the generation of secondary reflection stray light. However, in the former case, it is not possible to use a light emitting element having good connection efficiency with an optical fiber of the like, and on the other hand in the latter case the range of possible measurement distances is undesirably limited.

One object of the present invention is to provide easy selection of a light emitting element and a change-over shutter for a light-wave range finder capable of reducing measuring error due to secondary reflection stray light without limiting the range of possible measurement distances.

Figure 3:
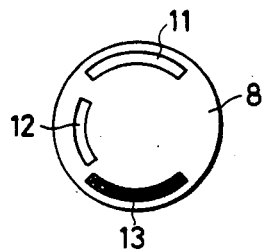
FIGS. 3 to 5 are front views of a change-over shutter according to the present device invention.
Figure 4:
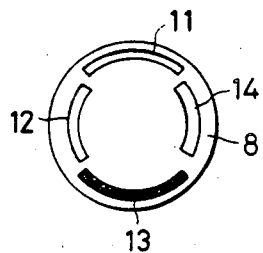
Figure 5:
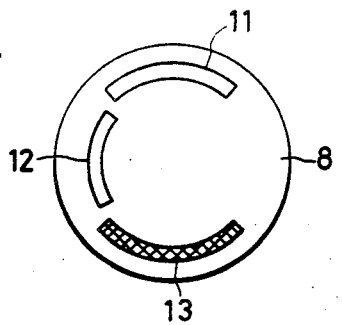

Referring to FIGS. 3 to 5, preferred embodiments of the present device will be explained. In FIG. 3, an arc-shaped measurement slit 11 for measurement light and an arc-shaped compensation slit 12 for compensation light are provided on a change-over shutter 8 with a suitable angular interval therebetween, similarly to the conventional change-over shutter as shown in FIG. 2(c). This shutter differs from the conventional change-over shutter in that there is provided a second measurement slit 13 for measurement light positioned opposite to the measurement slit 11 and provided with a density filter as a light-quantity reducing member.

Namely, in order to reduce the measuring error due to secondary reflection stray light in the measurement of short distances, and so as not to limit the measurable distance in the measurement of long distances, the compensation slit 12 and the measurement slit 13 having the density filter are used in the case of short distance measurements, and the measurement slit 11 and the compensation slit 12 are utilized when making long distance measurements.

To change over the slits thus constructed, a pulse motor or the like is utilized as a drive motor 10, and the change-over operation can be easily controlled by means of a micro-computer. Further, the change-over operation may be easily achieved by those of ordinary skill in the art by utilizing a solenoid and the like as well.

Referring to FIG. 4, a second embodiment of the change-over shutter according to the present invention illustrated in the figure is different from the embodiment shown in FIG. 3 in that another compensation slit 14 for compensation light is provided opposite to the compensation slit 12. In the second embodiment, the measurement slit 11 and the compensation slit 12 are utilized in long distance measurement, and the measurement slit 13 and the compensation slit 14 are utilized in the measurement of short distances.

In the above-described first and second embodiments, the slits are provided at about 90° angular intervals but the angular interval may be changed in accordance with the driving system.

Referring to FIG. 5, a third emdodiment is shown, in which the light-quantity reducing member having the density filter as shown in first embodiment of FIG. 3 is replaced by a mesh-like light-quantity reducing member 13. Alternatively, it is possible to use an optical stop composed of a measurement slit of small width.

According to the present device, secondary reflection stray light affecting short distance measurements can be eliminated by the measurement slit provided with the light-quantity reducing member to thereby reduce the measurement error, and in the case of long distance measurements, the usual measurement slit can be utilized, so that the measurable distance is not limited thereby. Further, it is usually necessary for the density of an ND filter of the light-quantity adjuster to set the density D within a range 0 to 4, however, if an ND filter with D=1 is used for the light-quantity reducing member with respect to short distance measurements, the density range of the ND filter used for the light-quantity adjuster may be about 0 to 3. Thus, the selection and manufacturing of such an ND filter can be made easy, which is an important advantage of the present device.

What is claimed is:

1. A change-over shutter for a light-wave range finder for changing over between measurement light and compensation light, comprising; a shutter body having a plurality of measurement light slits and at least one compensation slit, and a light-quantity reducing member provided in at least one of said measurement light slits.

2. A change-over shutter as described in claim 1, wherein said light-quantity reducing member comprises a density filter.

3. A change-over shutter as described in claim 1, wherein said light-quantity reducing member comprises a mesh-like element.

4. A change-over shutter as described in claim 1, wherein said light-quantity reducing member comprises means for narrowing at least one of said measurement slits.

5. A change-over shutter as described in claim 1, wherein said at least one measurement light slit provided with said light-quantity reducing member comprises a short-distance measurement measurement light slit.

6. A change-over shutter as described in claim 1, wherein said shutter body includes a pair of said measurement light slits at a predetermined angular interval, said light-quantity reducing member being provided in one of said measurement light slits.

7. A change-over shutter as described in claim 1, wherein said shutter body includes a pair of compensation light slits arranged at a predetermined angular interval.

8. A change-over shutter as described in claim 7, said compensation light slits and said measurement light slits being alternately angularly arranged in a non-overlapped manner.

9. A change-over shutter as described in claim 6, wherein the other of said measurement light slits comprises a long distance measurement measurement light slit.

10. A change-over shutter for light-wave range finder comprising a shutter body having at least one measurement light slit and at least one compensation light slit, and means for reducing amounts of secondarily reflected stray light passing through said measurement slit, thereby eliminating measurement error.

11. A change-over shutter for a light-wave range finder comprising a shutter having at least one measurement light slit and at least one compensation light slit, and means for reducing amounts of secondarily reflected stray light passing through said measurement slit, thereby eliminating measurement error in short distance measurements otherwise caused by secondarily reflected stray light.

12. A change-over shutter for a light-wave range finder comprising a shutter body having first means for making long distance measurements and second means for making short distance measurements, said first means having at least one first measurement light slit, and said second means having at least one second measurement light slit different from said at least one first measurement light slit.

* * * * *